United States Patent [19]
Hopkins et al.

[11] Patent Number: 5,187,626
[45] Date of Patent: Feb. 16, 1993

[54] DISK HEAD ASSEMBLY ATTACHMENT MEANS AND METHOD

[75] Inventors: Lionel Hopkins, San Diego; Thomas H. Kemp, Rancho Santa Fe; Warren Coon, Poway, all of Calif.

[73] Assignee: Computer & Communications Technology Corp., San Diego, Calif.

[21] Appl. No.: 689,132

[22] Filed: Apr. 22, 1991

Related U.S. Application Data

[63] Continuation of Ser. No. 400,369, Aug. 30, 1989, abandoned.

[51] Int. Cl.⁵ ................................................ G11B 5/48
[52] U.S. Cl. ..................................................... 360/104
[58] Field of Search ................................. 360/104, 106

[56] References Cited

U.S. PATENT DOCUMENTS

| | | | |
|---|---|---|---|
| 4,829,395 | 5/1989 | Coon | 360/104 |
| 4,912,583 | 3/1990 | Hinlein | 360/103 X |
| 4,991,045 | 2/1991 | Oberg | |
| 5,003,420 | 3/1991 | Hinlein | 360/106 X |

*Primary Examiner*—A. J. Heinz
*Attorney, Agent, or Firm*—Spensley Horn Jubas & Lubitz

[57] ABSTRACT

A disk head assembly attachment means and method for reducing the height of each support arm of a head stack assembly of a disk drive, thereby reducing the required disk-to-disk spacing. A first load beam assembly having a first boss is attached to a support arm of a head stack assembly. A second load beam assembly having a second boss is attached to the same support arm of the head stack assembly, with the second load beam assembly being positioned on the side of the support arm opposite the first load beam assembly. The first and second boss are designed to either nest one in the other, or set adjacent each other, such that each support arm of the head stack assembly need only accommodate the height of a single boss rather than the combined height of both bosses.

31 Claims, 8 Drawing Sheets

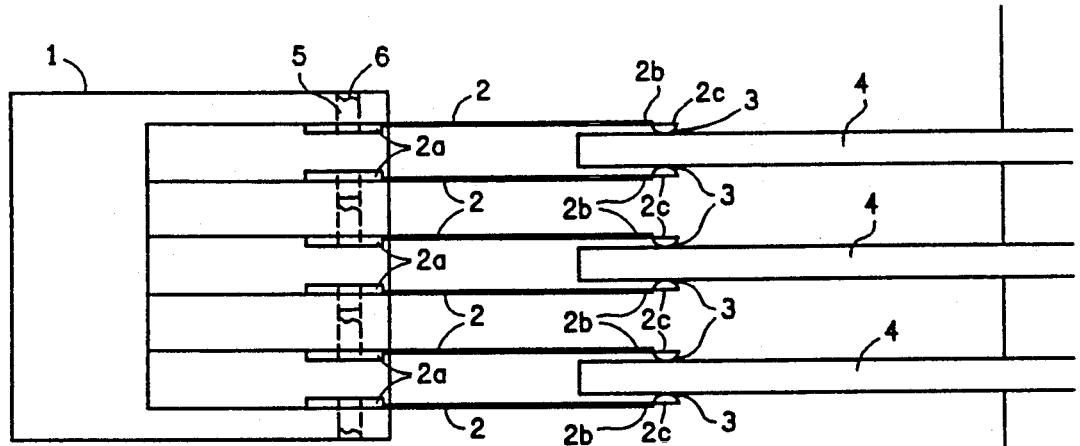
FIG. 1
PRIOR ART
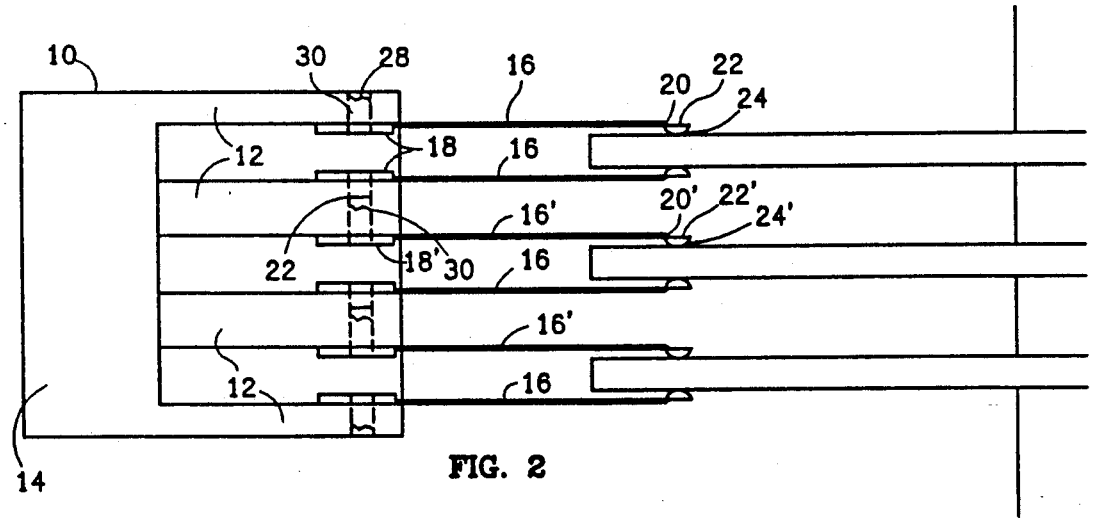
FIG. 2
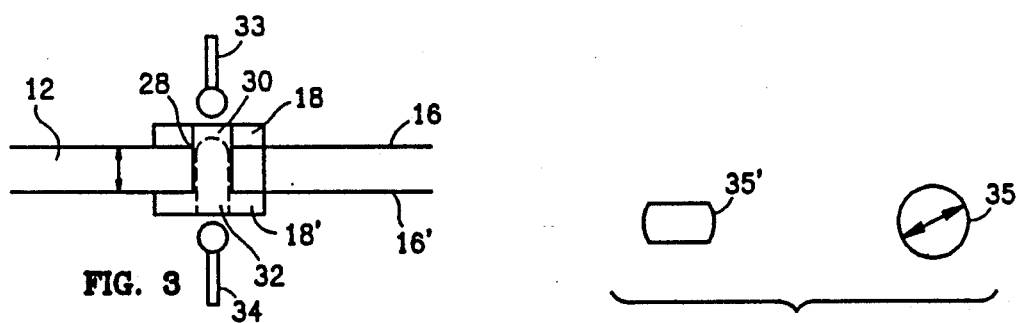
FIG. 3
FIG. 3a

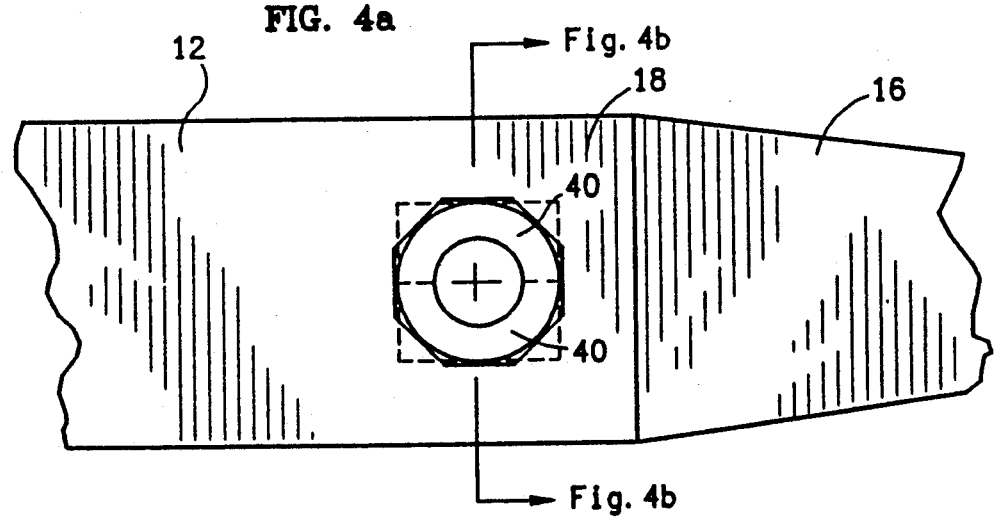
FIG. 4a
FIG. 4b
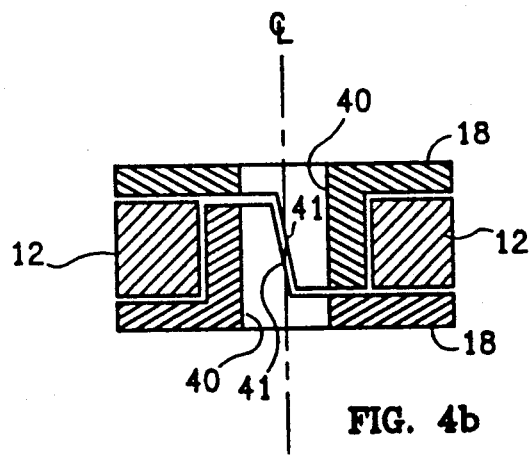
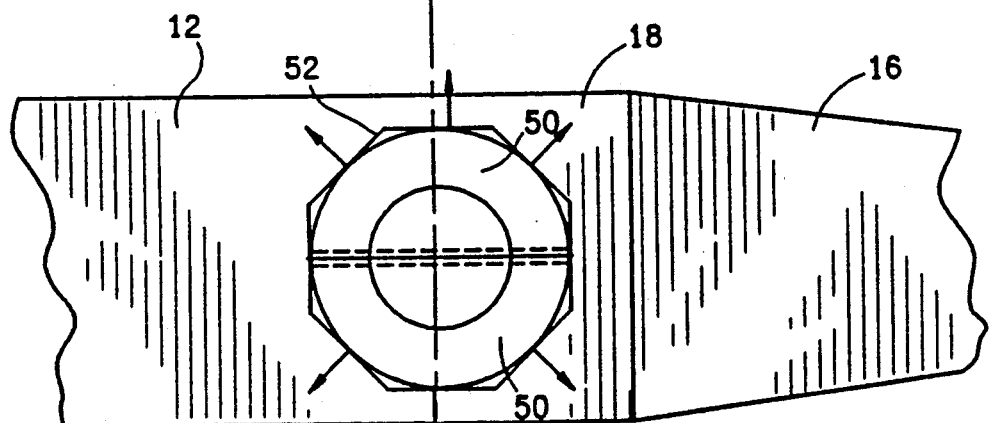
FIG. 5a
FIG. 5b

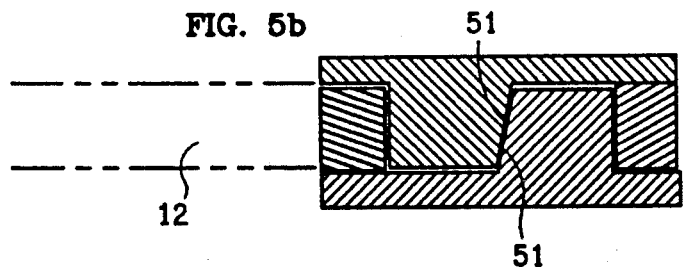
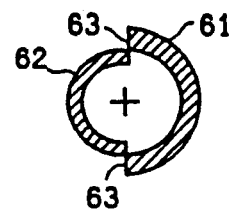
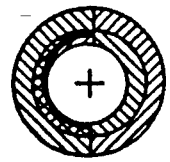
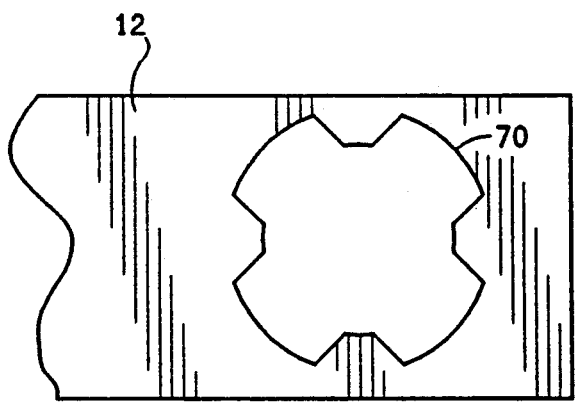
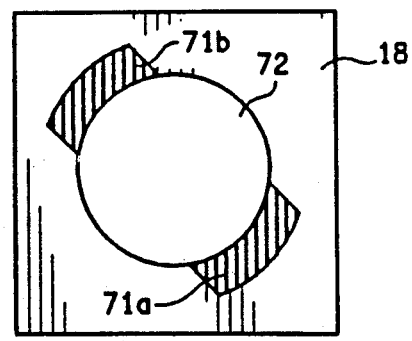

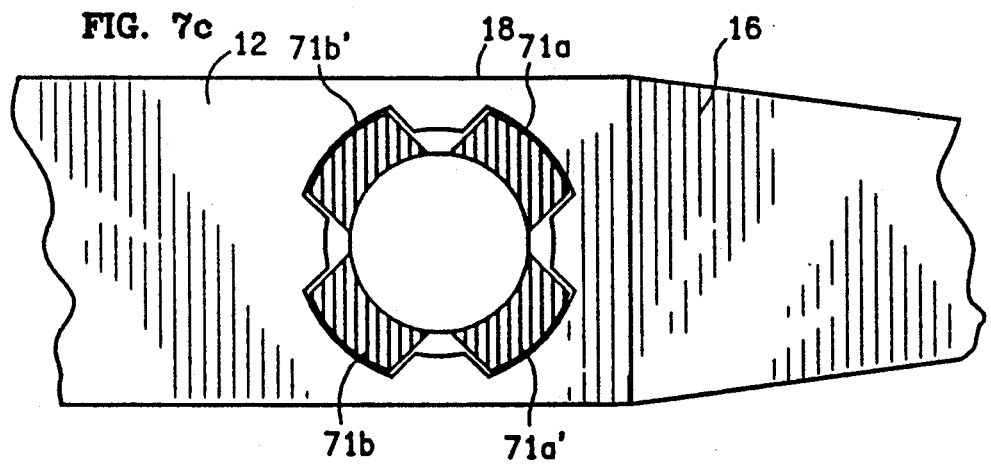
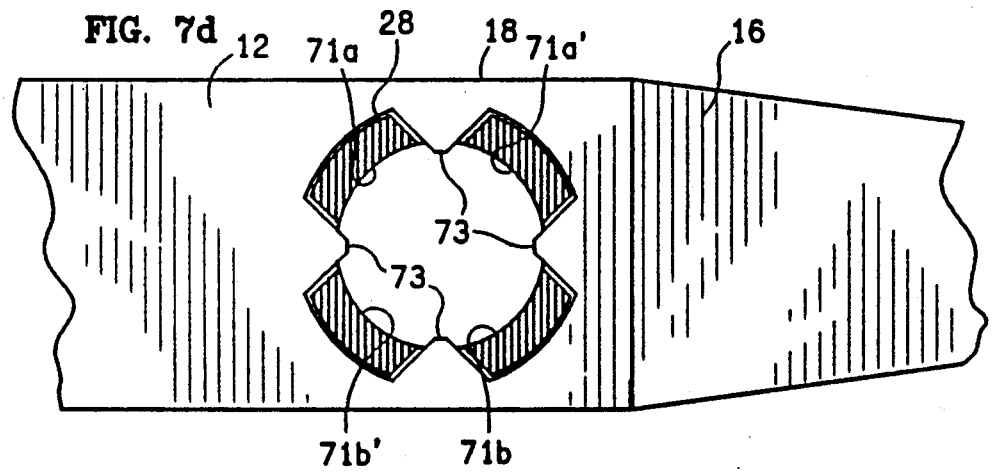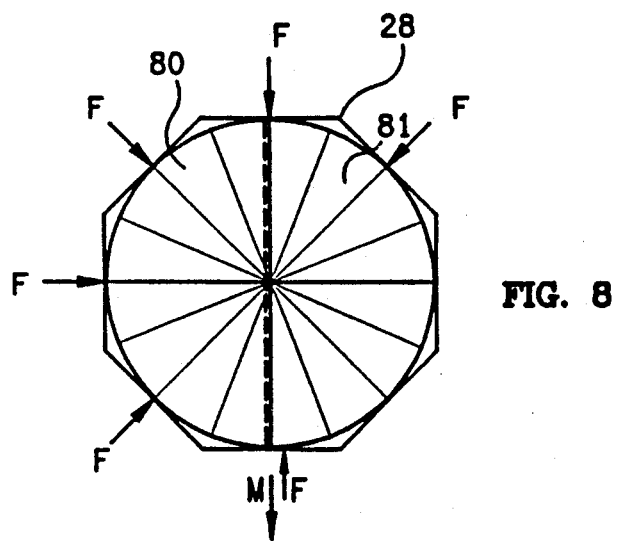

DISK HEAD ASSEMBLY ATTACHMENT MEANS AND METHOD

This is a continuation of application Ser. No. 07,400,369 filed on Aug. 30, 1989, now abandoned.

BACKGROUND OF INVENTION

1. Field of the Invention

This invention relates to disk head assemblies for supporting read/write heads adjacent rotating disks in disk drives. More particularly, this invention relates to means for attaching load beam assemblies to a head stack assembly or arm.

2. Description of Related Art

In computer disk drives, electromagnetic heads for reading and writing magnetic disks are mounted on relatively delicate structures known as "load beam assemblies". A plurality of load beam assemblies are typically firmly mounted on a structure known as a "head stack assembly". A head stack assembly typically consists of a plurality of support arms disposed in line parallel to the common axis of the disks and all carried by a common carriage. A common type of head stack assembly is an "E" block, which refers to the general shape of the arms and carriage of the head stack assembly.

It has been a continuing objective of the disk drive industry to produce disk drives of increased storage capacity and decreased size. One approach to increasing the storage capacity of a "hard" disk drive is to increase the number of disks. However, as the number of disks increases, the physical height of the drive increases as well. To minimize or eliminate the increase in overall height of the disk drive, workers in the art are continually seeking to reduce the spacing between disks. However, the space between each pair of disks in a stack must be sufficient to accommodate two magnetic heads, a head stack assembly support arm, and two load beam assemblies on which the heads are mounted. Even for disk drives, with a single disk, disk drive designers prefer the lowest mass structure possible for the head arm assembly so that the head actuator may be reduced in size and power and increased in speed of response.

Commonly assigned U.S. Pat. No. 4,829,395 entitled "Improved Load Beam/Flexure Assembly for Close Clearance Mini-Composite and Mini-Monolithic Winchester Disk Drive", discloses an improved load beam and head stack mounting assembly. This improved structure achieves a significant reduction in disk-to-disk spacing over the prior art by replacing the customary multi-piece head stack assembly with a unitary assembly, and by utilizing a ball-staking technique to attach the load beam assemblies to the head stack assembly in lieu of the customary technique using miniature machine screws. Utilization of the ball-staking technique disclosed in U.S. Pat. No. 4,829,395 (incorporated herein by reference) results in disk drives which are smaller in size, structurally simpler, and less expensive to manufacture than previously known drives.

FIG. 1 depicts a prior art "E" block head stack assembly 1 and a number of attached load beam assemblies 2, as disclosed in U.S. Pat. No. 4,829,395. Each load beam assembly 2 includes an insert (or staking plate) 2a and a flexure 2b. Each load beam assembly further includes a slider 2c attached to the end of the flexure 2b. An electromagnetic read/write head 3 is affixed to the slider 2c. The disk head 3 reads data from, or writes data to, an associated rotating computer disk 4.

A hollow, cylindrical boss (or staking hub) 5 extends from one surface of the insert 2a of the load beam assembly 2. A corresponding staking hole 6 is located in each arm of the "E" block 1. The boss 5 of the load beam assembly is dimensioned to fit into the staking hole 6 located in the arm of the "E" block. To firmly fasten the load beam assembly 2 to the "E" block 1, the boss 5 is inserted into the staking hole 6 and a ball-staking tool is then inserted into the hole of the boss. The staking tool expands ("swages") the boss to create a very tight friction fit against the sides of the staking hole 6. To ensure such a tight fit, the length of the boss 5 must be such that sufficient contact exists between the outer portion of the boss 5 and the inner portion of the staking hole 6 so as to resist accidental removal or repositioning.

Generally, head stack assemblies contain up to 16 load beam assemblies which are staked, or swaged, in line. Each arm of the "E" block must be of a height sufficient to accommodate the length of two bosses 5 (one inserted into each end of a staking hole 6). By utilizing the ball-staking technique disclosed in U.S. Pat. No. 4,829,395, the spacing between adjacent disks may be reduced to approximately 0.16 inch in a typical disk drive.

Although ball-staking has a number of advantages over the prior art, other techniques could be used to attach a load beam assembly to a head stack assembly.

It is an object of this invention to permit a reduction in the disk-to-disk spacing of a disk drive when using ball-staked load beam assemblies attached to a head stack assembly, thereby allowing for a reduction in size of the disk drive.

It is another object of this invention to permit a reduction in the disk-to-disk spacing of a disk drive when using load beam assemblies attached to a head stack assembly by means other than ball-staking, thereby allowing for a reduction in size of the disk drive.

It is yet another object of this invention to reduce the mass and thickness of a head arm assembly, thereby allowing for an increase in access speed and a decrease in size, mass, and power required.

SUMMARY OF THE INVENTION

The present invention accomplishes a reduction in disk-to-disk spacing over the prior art by providing an improved disk head assembly attachment means. More specifically, a reduction in disk-to-disk spacing is accomplished by decreasing the required thickness of the support arms of the head stack assembly.

In the preferred embodiment of the present invention, load beam assembly inserts are manufactured with hollow bosses of two alternative dimensions. A first insert is provided with a boss dimensioned to fit within a staking hole of a support arm of a head stack assembly. A second insert is provided with a boss dimensioned to fit inside the first boss. The load beam assemblies are firmly attached to the head stack assembly as follows: a first load beam assembly, having a boss of the larger, first dimension, is ball-staked into one end of a correspondingly dimensioned staking hole of a support arm; a second load beam assembly, having a boss of the lesser, second dimension, is then fitted into the hole in the boss of the first load beam assembly from the other end of the hole of the support arm, and is ball-staked into the boss of the first load beam assembly. Thus, each support arm of the head stack assembly need only accommodate the height of a single boss rather than the combined height of both bosses, as in the prior art.

A number of alternative designs embodying the basic concepts of the invention are also disclosed. In each design, a first load beam assembly having a first boss is attached to a support arm of a head stack assembly. A second load beam assembly having a second boss is attached to the same support arm of the head stack assembly, with the second load beam assembly being positioned on the side of the support arm opposite the first load beam assembly. The first and second boss are designed to either nest one in the other, or set adjacent each other, such that each support arm of the head stack assembly need only accommodate the height of a single boss rather than the combined height of both bosses.

Further aspects of the present invention will become apparent from the following detailed description when considered in conjunction with the accompanying drawings. It should be understood, however, that the detailed description and the specific examples, while representing the preferred embodiment and several alternative embodiments of the invention, are given by way of illustration only.

BRIEF DESCRIPTION OF THE DRAWINGS

FIG. 1 is a partial plan side view of a disk drive made according to the prior art.

FIG. 2 is a partial plan side view of a disk drive made in accordance with the preferred embodiment of the present invention.

FIG. 3 is an enlarged cross-sectional side view of FIG. 2 showing the mounting inserts of two load beam assemblies mounted to a support arm of a head stack assembly in accordance with the preferred embodiment of the present invention.

FIG. 3a shows a side view of a plug and ball which may be used to attach the present invention to a head stack assembly arm.

FIG. 4a is a top plan view of the insert region of a first alternative embodiment of the present invention.

FIG. 4b is a cross-sectional view along line AA of FIG. 4a.

FIG. 5a is a top plan view of the insert region of a second alternative embodiment of the present invention.

FIG. 5b is a cross-sectional view along line AA of FIG. 5a.

FIG. 6a is a side plan view of the unassembled insert and bosses of a third alternative embodiment of the present invention.

FIG. 6b is a cross-sectional view along line AA of FIG. 6a.

FIG. 6c is a cross-sectional view along line BB of FIG. 6a.

FIG. 6d is a side plan view of the assembled insert and bosses of the third alternative embodiment of the present invention.

FIG. 6e is a cross-sectional view along line CC of FIG. 6d.

FIG. 7a is a top plan view of the staking hole of a support arm of a fourth alternative embodiment of the present invention.

FIG. 7b is a top plan view of the boss of an insert region of the fourth alternative embodiment of the present invention.

FIG. 7c is a cross-section view through a plane of a head stack assembly arm, showing two interlocking bosses of an assembled version of the fourth alternative embodiment of the present invention.

FIG. 7d is a cross-section view through a plane of a head stack assembly, showing a variation of the fourth alternative embodiment of the present invention shown in FIG. 7c.

FIG. 8 is a top plan view of the insert region of a fifth alternative embodiment of the present invention.

FIG. 9d is a cross-sectional view along line AA of FIG. 9a.

FIG. 10b is a top plan view of the insert region of a variation of the seventh alternative embodiment of the present invention shown in FIG. 9a.

Like reference characters in the various drawings refer to like elements.

DETAILED DESCRIPTION OF THE INVENTION

Figure 9A:
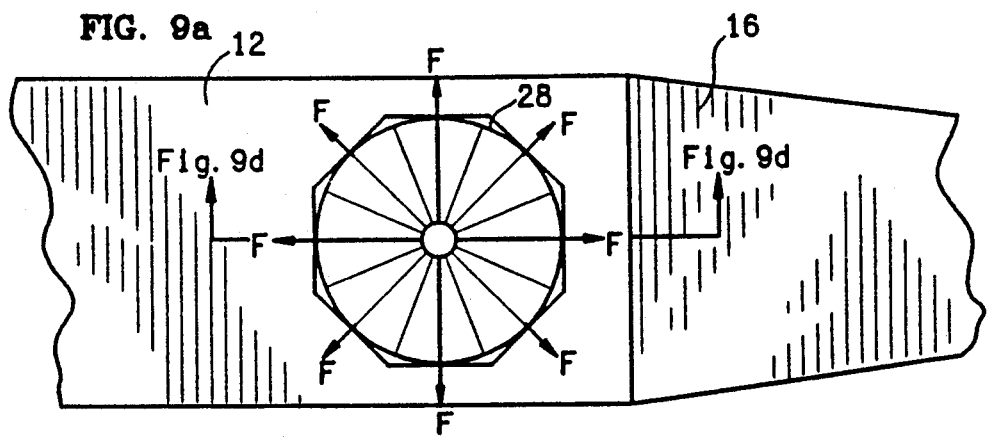
FIG. 9a is a top plan view of the staking hole region of a sixth alternative embodiment of the present invention.
Figure 9B:
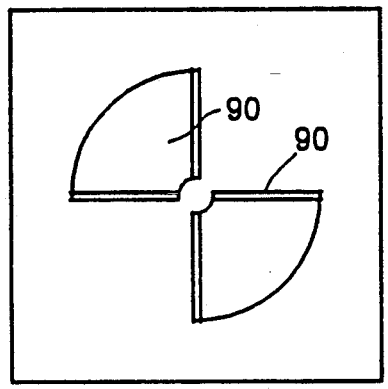
FIG. 9b is a top plan view of the boss of an insert region of the sixth alternative embodiment of the present invention.

The following description is of the best presently contemplated modes of carrying out the invention. This description is made for the purpose of illustrating the general principles of the invention and should not be taken in a limiting sense.

FIG. 2 partially depicts a hard disk drive utilizing the disk head assembly attachment means of the present invention. The hard disk drive includes an "E" block-type head stack assembly 10 having a plurality of arms 12 and a common carriage 14. The hard disk drive further includes a plurality of load beam assemblies 16, 16'. Each load beam assembly 16, 16' includes a primary insert 18 or a secondary insert 18', respectively, a flexure 20, and a slider 22. The sliders 20 support magnetic read/write heads 24 adjacent disks 26.

As can be seen in more detail in FIG. 3, each support arm 12 of the head stack assembly is provided with a staking hole 28 traversing its height. In the preferred embodiment, each staking hole 28 is cylindrical (as shown) or octagonal, and each primary insert 18 of a load beam assembly 16 is provided with a hollow, cylindrical primary boss 30 dimensioned to fit within a staking hole 28 of the support arms 12, i.e., such primary bosses 30 have outside diameters slightly smaller than the inside diameters of the staking holes 28. Each secondary inserts 18' of each load beam assembly 16', on the other hand, is provided with a hollow, cylindrical secondary boss 32 dimensioned to fit within the hollow interior of a corresponding primary boss 30, i.e., such secondary bosses 32 have outside diameters slightly smaller than the inside diameters of the primary bosses 30. In the preferred embodiment, the bosses 30, 32 form passages through the respective inserts 18, 18' on which they are provided. The shape of the primary and secondary bosses 30, 32 preferably corresponds to the shapes of standard bosses utilized in the ball-staking art.

In the preferred embodiment, to attach the load beam assemblies 16, 16' to the head stack assembly 10, a load beam assembly 16 having a primary insert 18 is positioned against one side of an arm 12 so that its primary boss 30 extends into the staking hole 28. A first ball or pin 33 of appropriate size is then pressed through the passage formed by the hollow interior of the primary boss 30. The first ball or pin 33 will push out or swage the walls of the primary boss 30 against the interior walls of the hole 28, thereby fixedly connecting the primary boss 30 and its associated load beam assembly 16 to the support arm 12.

A second load beam assembly 16' having a secondary insert 18' is then positioned adjacent the other side of the support arm 12. Since the secondary boss 32 has an outside diameter slightly smaller than the inside diameter of the primary boss 30, the secondary boss 32, upon being inserted into the staking hole 28, also fits within the passage formed by the hollow interior of the primary boss 30. A second ball or pin 34 of slightly larger dimension than the inside diameter of the secondary boss 32 is then pressed through the passage formed by the hollow interior of the secondary boss 32. The walls of the secondary boss 32 are thereby pushed out or swaged against the interior walls of the primary boss 30, fixedly connecting the secondary boss 32 and its associated load beam assembly 16' to the support arm 12. Thus, when mounted, the staking hole 28 and the primary and secondary bosses 30, 32 are arranged concentrically, in a nested relationship, and form a single passage through the support arm 12.

All of the load beam assemblies 16 having primary inserts 18 may be ball-staked in one step. After such load beam assemblies 16 have been connected, all of the load beam assemblies 16' having secondary inserts 18' may be ball-staked in a second step.

A second method of assembly is to simultaneously position two load beam assemblies 16, 16', one having a primary insert 18 and the other having a secondary insert 18', in place with respect to a staking hole 28, and then pressing a ball or pin through the secondary boss 32 of the secondary insert 18'. This will simultaneously stake or swage both the primary boss 30 and the secondary boss 32.

A third method of assembly is to use a ball 35 or plug 35', as shown in FIG. 3a, to stake the secondary boss 32 of the secondary insert, either after the primary boss 30 has been ball-staked in a first step, or simultaneously with the staking of primary boss 30 as in the second method of assembly. The ball 35 or plug 35' is left inside of the secondary boss 32.

The inventive disk head assembly attachment means, as described above, significantly reduces the required height of each support arm since the support arms need only be high enough to accommodate one length of a boss, whereas previously the support arm was required to have a height sufficient to accommodate two lengths of bosses. Thus, the spacing between disks may be reduced from approximately 0.16 inches for prior art ball-staking assemblies, to approximately 0.090 inches, accomplishing a substantial reduction in the height of a hard disk drive.

A number of alternative embodiments of the present invention can be designed using the principles of the invention. In all of these alternative embodiments, a first load beam assembly having a first boss is attached to a support arm of a head stack assembly. A second load beam assembly having a second boss is attached to the same support arm of the head stack assembly, with the second load beam assembly being positioned on the side of the support arm opposite the first load beam assembly. The first and second bosses are designed to either nest one in the other, or set adjacent each other, such that each support arm of the head stack assembly need only accommodate the height of a single boss rather than the combined height of both bosses. Following are brief descriptions of a number of such alternative embodiments.

In FIG. 4a, each of two inserts 18 has a semicircular boss 40. Bosses 40 are shown in cross-section in FIG. 4b. Because the semicircular shape of each boss 40 is symmetrical along the longitudinal axis of the arm 12 and load beam assembly 16, only one type of insert 18 and boss 40 need be manufactured, since a second load beam assembly 16 attached to the arm 12 on the opposite side will have its boss 40 "flipped" in orientation with respect to the boss 40 of the opposing load beam assembly 16. As shown in FIG. 4b, by beveling the mating edges 41 of the opposing bosses 40, the two inserts 18 can be firmly attached to the arm 12 by means of a wedged friction fit. Alternatively, or in addition, ball staking or plug staking can be used, since the interior of the semicircular bosses 40 is hollow.

FIG. 5a shows another alternative embodiment, similar to the embodiment shown in FIGS. 4a and 4b, except that the semicircular bosses 50 are not hollow. As shown in FIG. 5b, the mating edges 51 are beveled to provide a friction fit of the two bosses 50 when they are compressed while positioned within the staking hole (shown as an octagon 52 in FIG. 5a) of a support arm 12. When re-work needs to be done on a particular pair of load beam assemblies, a shim can be placed between the beveled edges 51 of the bosses 50 to compensate for any enlargement of the staking hole 52.

FIG. 6a shows an embodiment in which the bosses 60 of two inserts 18 are mirror images of each other, and comprise two semicircular facing projections 61 and 62 (as shown in FIGS. 6b and 6c), with each of the semicircles 61, 62 being slightly separated at their nominal intersection 63. The slight separation permits two opposing inserts 18 with such bosses 60 to be nested as shown in FIGS. 6d and 6e. Load beam assemblies having such inserts 18 and bosses 60 can be attached to a support arm 12 by ball staking or plug staking each pair of assembled inserts.

Yet another alternative embodiment is shown in FIG. 7a-7c. In FIG. 7a, a cruciform staking hole 70 is formed in a support arm 12. Each insert is provided with a boss having two separated projections 71. The insert 18 is provided with a hole 72 separating the boss projections 71a, 71b. Two load beam assemblies 16 having such inserts 18 will be positioned facing one another, such that the boss projections 71a, 71b and 71a', 71b' cross each other, as shown in FIG. 7c. Attachment of such bosses can again be by means of ball staking or plug staking.

FIG. 7d is a variation on the structure shown in FIG. 7c. In the version shown in FIG. 7d, the staking hole 28 contains projections 73 around which the boss projections 71a, 71b, and 71a', 71b', pass when two inserts having such bosses are mounted around the staking hole 28 of a support arm 12. When a ball staking tool is pressed through the hollow interior of the bosses, the projections 73 of the staking hole 28 are flattened against the adjacent boss projections 71a, 71b, and 71a', 71b', thereby pinning the bosses to the walls of the staking hole 28.

FIG. 8 shows an alternative embodiment in which the bosses 80 and 81 are formed in the shape of half an octagon, and the staking hole 28 is formed as a matching octagon (similar to the boss structures shown in FIGS. 5a and 5b). An octagon has two radii: the distance from the center to an outer apex, and the distance from the center to a mid-point on a flat edge of the octagon. In the embodiment shown in FIG. 8, by twisting the bosses 80, 81 approximately 22½ degrees, the greater radii of the octagon formed by the paired bosses 80, 81 will be cammed against the lesser radius of the staking hole 28, thereby locking the assembly into place in the support arm. While the shape of the staking hole in FIG. 8 is depicted as an octagon with matching bosses, any regular polygon shape may be substituted.

Figure 9C:
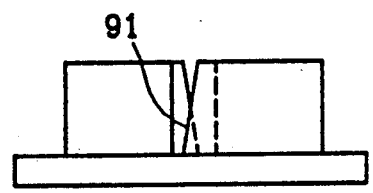
FIG. 9c is a side view of the boss of an insert region of the sixth alternative embodiment of the present invention.
Figure 9D:
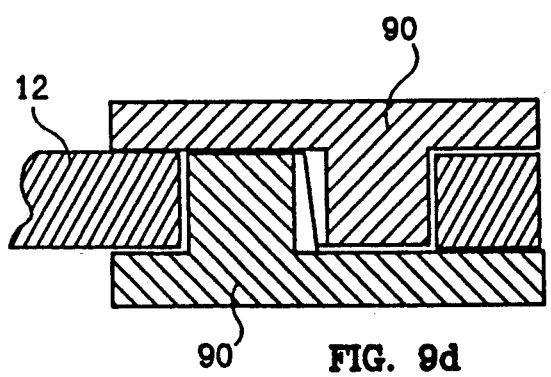

FIGS. 9a–9d show another embodiment of the present invention, in which each insert 18 has a boss comprising two wedge-shaped projections 90 having beveled edges 91 (see FIG. 9c). When two load beam assemblies 16 having inserts with such bosses 90 are positioned within a staking hole 28, the bosses are compressed so that the beveled edges 91 cause the bosses to be friction fitted into the staking hole 28.

Figure 10A:
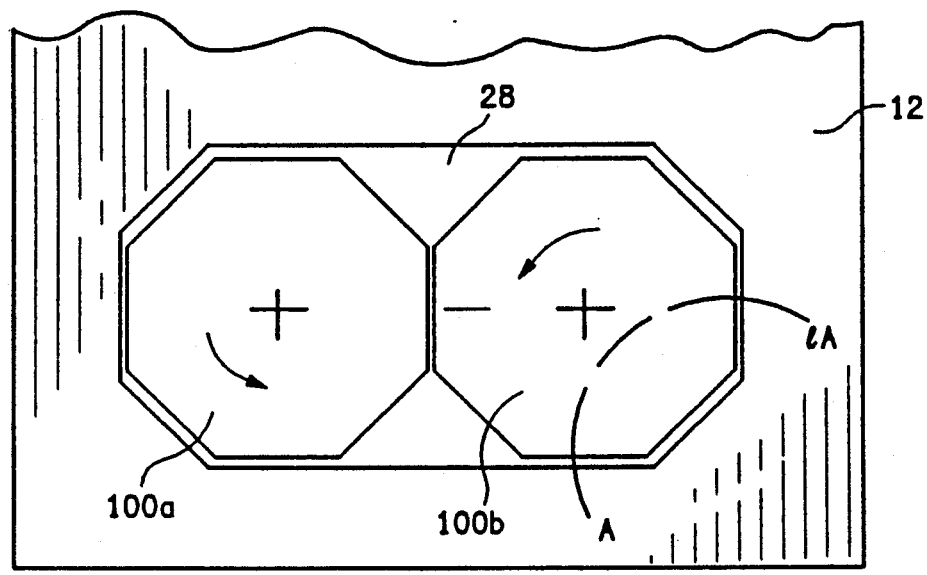
FIG. 10a is a top plan view of the insert region of a seventh alternative embodiment of the present invention.
Figure 10B:
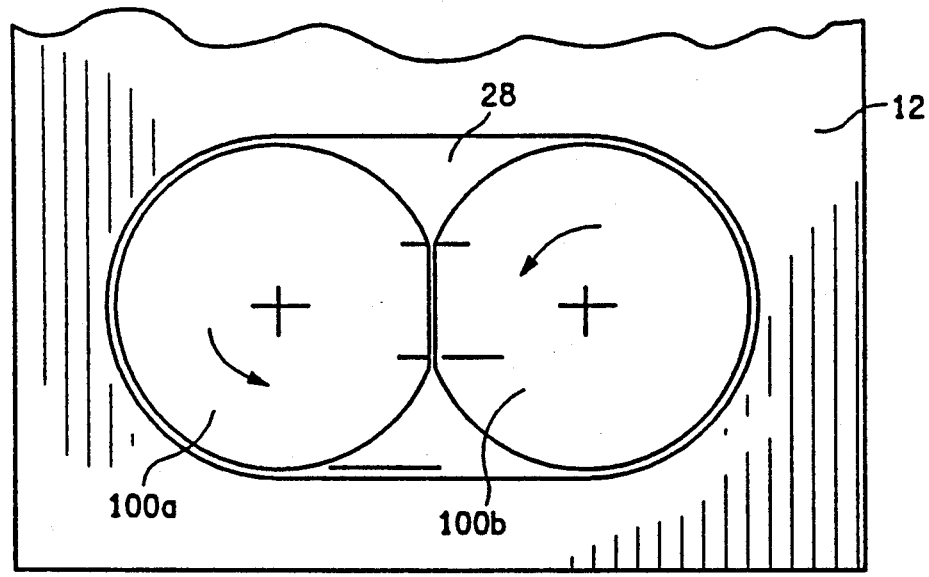

FIGS. 10a and 10b show alternative embodiments of the present invention in which the staking hole 28 is sized to receive two side-by-side bosses. Each insert is provided with a boss 100 which is offset from the midline of the insert. When two load beam assemblies having such inserts and bosses 100 are positioned opposite each other, within a staking hole 28 of a support arm 12, the bosses 100 of the two load beam assemblies will be positioned side-by-side, as shown in FIGS. 10a and 10b. The bosses 100 may be octagonal, as shown in FIG. 10a, or approximately circular with a flat face, as shown in FIG. 10b. By twisting the bosses against each other, the bosses will "cam" against each other, thereby firmly attaching the load beam assembly to the support arm 12.

Figure 11A:
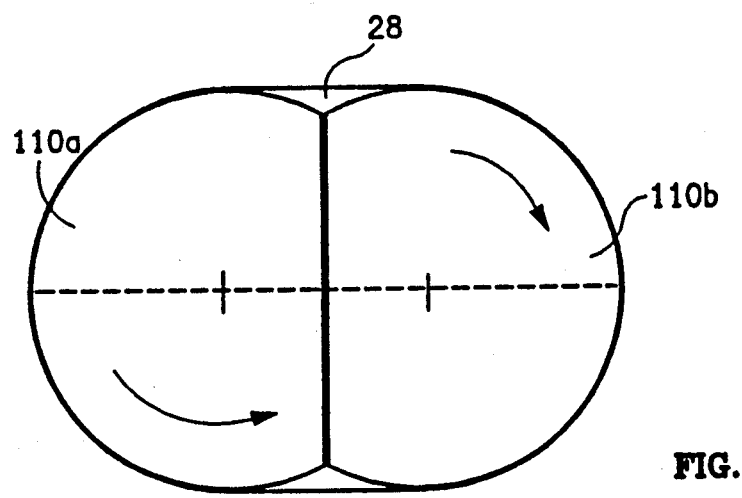
FIG. 11a is a top plan view of the insert region of an eighth alternative embodiment of the present invention, showing the open position.
Figure 11B:
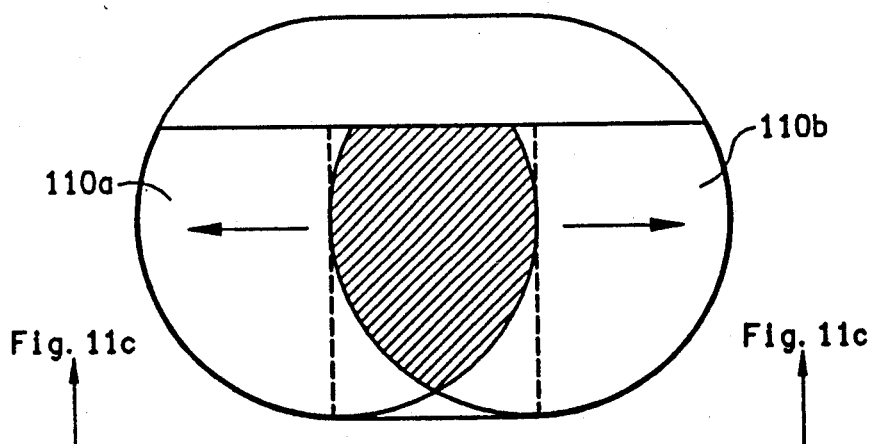
FIG. 11b is a top plan view of the insert region of the eighth alternative embodiment of the present invention, showing the closed position.
Figure 11C:
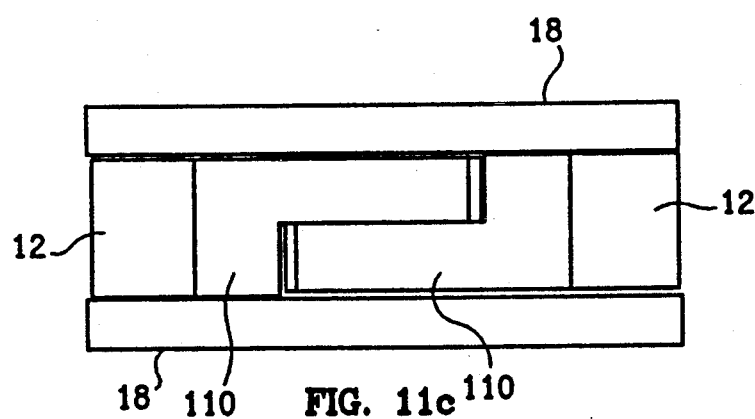
FIG. 11c is a cross-sectional view of the insert region of the eighth alternative embodiment of the present invention, shown along line AA of FIG. 11b.

FIGS. 11a–11c show a structure somewhat similar to that shown in FIG. 10b. However, the bosses 110 are fashioned as overlapping "L"-shaped cams, as better shown in FIG. 11c. Attachment of the bosses 110 and their associated inserts 18 to a support arm 12 is accomplished by rotating each interlocking boss 110 approximately 90 degrees.

Figure 12A:
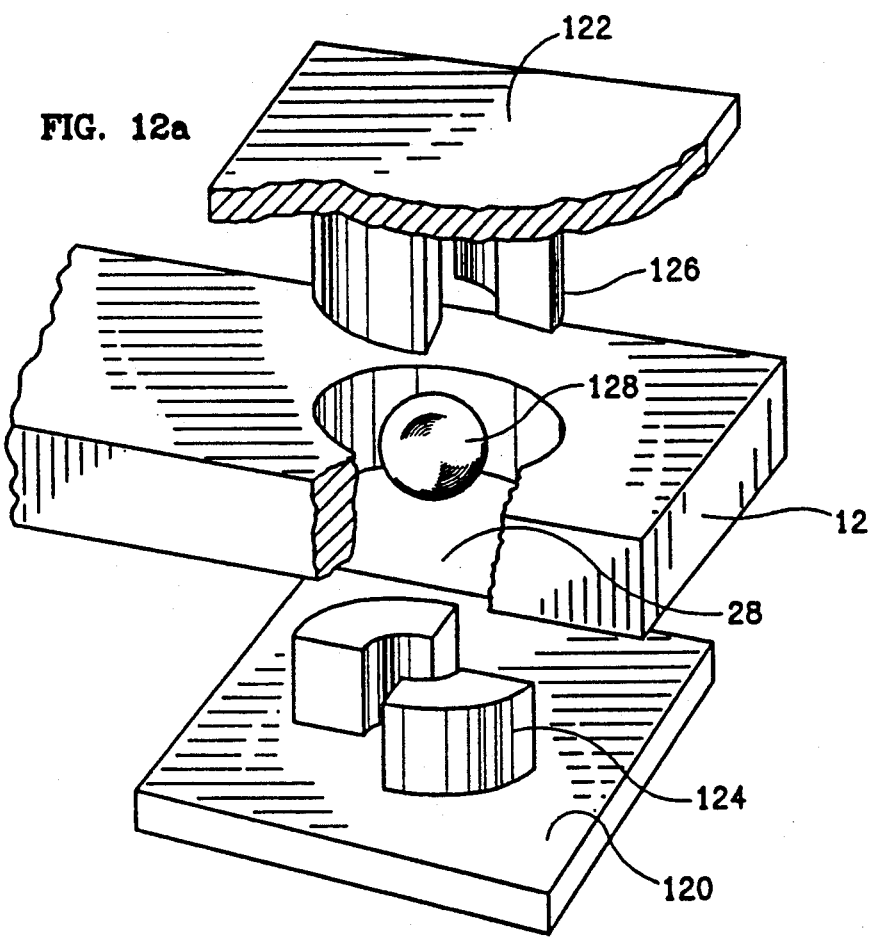
FIG. 12a is a perspective view of the insert region of a ninth alternative embodiment of the present invention.
Figure 12C:
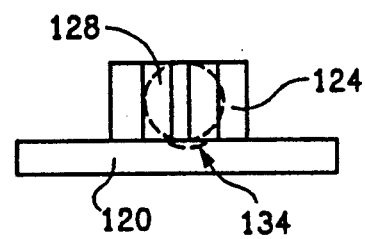
FIG. 12c is a side view of the insert region of the variation of the ninth alternative embodiment of the present invention.
Figure 12B:
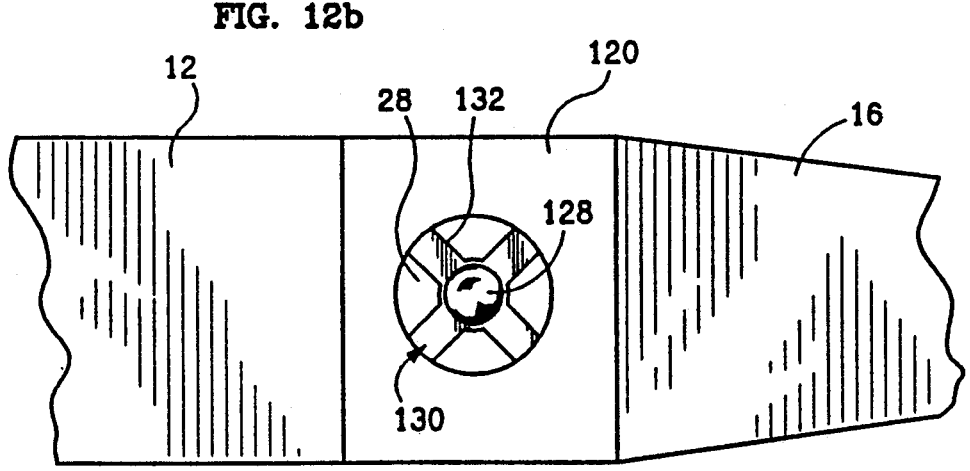
FIG. 12b is a top plan view of the staking hole region of a variation of the ninth alternative embodiment.

FIGS. 12a–12c show alternate embodiments of the present invention wherein the inserts 120, 122 are solid, i.e., the respective bosses do not form passages through the inserts. In these embodiments, load beam assemblies are staked to the arms of a head stack assembly using internal plugs or balls of the type shown in FIG. 3a.

For example, FIG. 12a depicts an embodiment wherein bosses 124 and 126 each comprises two wedge-shaped projections and the inserts 120, 122 with respective bosses 124, 126 are mirror images of each other. In this embodiment, two load beam assemblies are attached to each arm of the head stack assembly by placing a ball 128 or plug in the center of one of the bosses 124 or 126. The boss 124 or 126 with ball or plug in place is then inserted into the staking hole 28. The boss of the second load beam assembly is next inserted into the staking hole 28 from the opposite side. The load beam assemblies are secured to the arm by squeezing together the inserts 120 and 122 whereby the ball 128 or plug expands the walls of the bosses 124, 126 to form a friction fit against one another and against the arm 12. The ball 128 or plug remains in place creating a solid insert core.

FIG. 12b depicts a variation of the embodiment depicted in FIG. 12a wherein the projections forming the bosses 130, 132 have a different configuration.

As shown in FIG. 12c, the inserts 120, 122 may be provided with a shallow recess 134 for positioning and retaining a ball 128 or plug.

In the description of this invention, for simplicity a pair of load beam assemblies has been used to describe the attachment method. It is not required, however, that two load beam assemblies be used for each support arm. If only one load beam assembly is required to be attached to a support arm, attachment can be accomplished by using only a mating insert on the opposite side of the support arm from the load beam assembly. Thus, the phrase "load beam assembly" as used herein includes such a mating insert without other structure (such as a flexure or slider). This technique may be used with the preferred and all alternative embodiments of the invention.

A number of embodiments of the present invention have been described. Nevertheless, it will be understood that various modifications may be made without departing from the spirit and scope of the invention. For example, the shape of the bosses may be other than as illustrated. Also, the load beam assemblies may be attached to the support arms by methods other then ball-staking or plug-staking, for example, by mounting the primary and secondary bosses into the staking hole using an adhesive or by welding. If an adhesive or welding attachment method is utilized with hollow bosses, the secondary boss need not be hollow. The inventive structure can also be adapted for use with optical disk drives, and magnetic disk drives using flexible, semi-flexible, or semi-rigid disks. The invention can be used on single-arm head stack assemblies as well as multi-arm head stack assemblies. An advantage of the invention when used with either type of assembly is a reduction in mass of the assembly arms since each arm can be made thinner. Accordingly, it is to be understood that the invention is not to be limited by the specific illustrated embodiment, but only by the scope of the appended claims.

We claim:

1. A paired set of load beam assemblies for use with disk drive head stack assemblies having at least one support arm having a first and a second side, comprising:

(a) a first load beam assembly attached to the first side of a support arm, and having an insert provided with an at least partially hollow boss having a generally smooth interior wall, sized to fit within a hole in a portion of the support arm; and (b) a second load beam assembly attached to the second side of the support arm, and having an insert provided with a boss having a generally smooth exterior wall, sized to fit within the hollow portion of the boss of the first load beam assembly insert.

2. The disk head attachment assembly of claim 1 wherein at least part of the bosses of the first and second load beam assembly inserts are approximately semicircular in shape.

3. A paired set of load beam assemblies for use with disk drive head stack assemblies having at least one support arm having a first and a second side, comprising:
   (a) a first load beam assembly attached to the first side of a support arm, and having an insert provided with a hollow boss having a generally smooth interior wall, and of a first dimension sized to fit within a hole in a portion of the support arm; and
   (b) a second load beam assembly attached to the second side of the support arm, and having an insert provided with a boss having a generally smooth exterior wall, and of a second dimension sized to fit within the hollow boss of the first load beam assembly insert.

4. A disk head attachment assembly for a disk drive which is provided with a plurality of disks, comprising:
   (a) a head stack assembly having a plurality of arms spaced apart from one another to form an "E"-like structure, each arm having a staking hole which forms a passage through the arm;
   (b) at least one first load beam assembly, each first load assembly including an arm end having an insert, the insert being provided with a hollow boss of a first dimension sized to fit within the staking hole of a head stack assembly arm, the hollow boss forming an interior cavity;
   (c) at least one second load beam assembly, each second load beam assembly including an arm end having an insert, the insert being provided with a hollow boss of a second dimension sized to fit entirely with the cavity of the hollow boss of the first load beam assembly inserts.

5. The disk head attachment assembly of claim 4 wherein a first load beam assembly boss is swaged into the staking hole of the support arm to attach the first load beam assembly to a first side of a support arm, and wherein a second load beam assembly boss is swaged into the hollow boss of the first load beam assembly to attach the second load beam assembly to the opposite side of the support arm.

6. A method for reducing the height of a disk drive having a head stack assembly provided with a portion having a first side, a second side opposite the first side, and at least one hole, comprising the steps of:
   (a) providing at least one first load beam assembly having an insert provided with a hollow base having a generally smooth interior wall, the insert being of a first dimension sized to fit within the hole in the head stack assembly;
   (b) providing at least one second load beam assembly having an insert provided with a boss having a generally smooth exterior wall and being of a second dimension sized to fit within the hollow boss of the first load beam assembly insert;
   (c) affixing the first load beam assembly to the first side of the head stack assembly and the second load beam assembly to the second side of the head stack assembly whereby the hollow boss of the first load beam assembly insert is fitted within the hole of the head stack assembly and the boss of the second load beam assembly insert slides into the hollow of the boss of the first load beam assembly insert, the hole and the bosses being in a nested arrangement.

7. A method for attaching load beam assemblies to a head stack assembly for a disk drive, comprising the steps of:
   (a) providing a head stack assembly having at least one support arm, each support arm being provided with a staking hole which forms a passage through its height;
   (b) providing at least one first load beam assembly, each first load beam assembly including a first insert provided with a first hollow boss having a first dimension, wherein the first boss is dimensioned to fit within the passage provided by the staking hole of the support arm and wherein the first boss forms a second passage extending substantially through the height of the support arm;
   (c) providing at least one second load beam assembly, each second load beam assembly including a second insert provided with a second hollow boss having a second dimension, wherein the second boss is dimensioned to fit within the second passage formed by the first boss and wherein the second boss forms a third passage extending substantially through the height of the first boss and first insert;
   (d) inserting one first boss into each first passage formed by the staking hole of each support arm;
   (e) pressing a first staking tool through each second passage formed by each first boss, whereby each load beam assembly is fixedly connected to the support arm;
   (f) inserting one second boss into each second passage formed by each first boss, such that each second boss is located inside one first boss; and
   pressing a second staking tool through each third passage formed by each second boss, whereby each second load beam assembly is fixedly connected to the support arm.

8. A paired set of load beam assemblies for use with a disk drive head stack assembly, the head stack assembly including a support arm having a first side, a second side opposite the first side, and a support hole, the load beam assemblies comprising:
   (a) a first load beam assembly including a first boss having a central axis, a generally smooth interior wall defining an inner diameter, and an outer diameter; the first boss being inserted into the support arm hole from the first side of the support arm; and
   (b) a second load beam assembly including a second boss having a central axis, an inner diameter, and a generally smooth exterior wall defining an outer diameter, the second boss being inserted into the support arm hole from the second side of the support arm;
   (c) wherein the central axis of the first boss is substantially aligned with the central axis of the second boss, and the outer diameter of the second boss is less than or equal to the inner diameter of the first boss, permitting the second boss to nest within the first boss, thus providing a load beam assembly pair having a thickness approximately equal to the longitudinal dimension of the first boss, as measured along the central axis of the first boss.

9. A paired set of load beam assemblies as set forth in claim 8, wherein the first boss and the second boss each have a substantially circular shape along respective radial cross-sectional planes, and symmetrical along the central axes of the first and second bosses.

10. A paired set of load beam assemblies as set forth in claim 8, wherein the first boss and the second boss each have a octagonal shape along respective radial cross-sectional planes and symmetrical along the central axes of the first and second bosses; the diameter of the respective octagonal shapes being determined as twice the distance from the central axis to an apex.

11. A paired set of load beam assemblies as set forth in claim 8, wherein the first load beam assembly is attached to the first side of the support arm by positioning the first boss into the staking hole of the support arm and swaging the first boss to the staking hole, and wherein the second load beam assembly is attached to the opposite side of the support arm by positioning the second load beam assembly adjacent the opposite side of the support arm so that the second boss extends into the hollow boss of the first load beam assembly, and swaging the second boss to the first boss.

12. A paired set of load beam assemblies for use with a disk drive head stack assembly, the head stack assembly including a support arm having a first side, a second side opposite the first side, and a support arm hole, the load beam assemblies comprising:
    (a) a first load beam assembly including a first boss having a central axis, a longitudinal surface, an inner diameter, and an outer diameter, the first boss being inserted into the support arm hole from the first side of the support arm; and
    (b) a second load beam assembly including a second boss having a central axis, a longitudinal surface, an inner diameter, and an outer diameter, the second boss being inserted into the support arm hole from the second side of the support arm;
    (c) wherein the central axis of the first boss is substantially aligned with the central axis of the second boss;
    (d) wherein the first and second bosses are approximately semicircular across radial cross-sectional planes; the semicircular shape of the first boss being symmetrical to the semicircular shape of the second boss along the central axes of the bosses when the bosses are each inserted on respective sides of the support arm;
    (e) wherein the longitudinal surface of the second boss is positioned adjacent to the longitudinal surface of the first boss, thus locking the first and second bosses into position in the support arm hole.

13. A paired set of load beam assemblies as set forth in claim 12, wherein the longitudinal surface of the first and second bosses are bevelled, thus providing a wedged friction fit.

14. A paired set of load beam assemblies as set forth in claim 12, wherein the inner diameter of the first and second bosses is zero, such that the first and second bosses are solid, not hollow.

15. A paired set of load beam assemblies as set forth in claim 14, wherein the first boss contacts the second boss at one or more mating edge surfaces, and the mating edge surfaces are bevelled to provide a friction fit of the first and second bosses in the support arm.

16. A paired set of load beam assemblies, as set forth in claim 15, further including rework means for disassembling and reassembling the paired set of load beam assemblies, the rework means including one or more shims placed between the bevelled mating edge surfaces.

17. A paired set of load beam assemblies for use with a disk drive head stack assembly, the head stack assembly including a support arm having a first side, a second side opposite the first side, and a support arm hole, the load beam assemblies comprising:
    (a) a first load beam assembly including a first boss having a central axis, a longitudinal surface, an inner diameter, and an outer diameter, the first boss being inserted into the support arm hole from the first side of the support arm; and
    (b) a second load beam assembly including a second boss having a central axis, a longitudinal surface, an inner diameter, and an outer diameter, the second boss being inserted into the support arm hole from the second side of the support arm;
    (c) wherein the central axis of the first boss is substantially aligned with the central axis of the second boss;
    (d) wherein the first and second bosses are approximately semioctagonal across radial cross-sectional planes; the semioctagonal shape of the first boss being substantially symmetrical to the semioctagonal shape of the second boss along the central axes of the bosses when the bosses are inserted on respective sides of the support arm; and
    (e) wherein the longitudinal surface of the second boss is positioned adjacent to the longitudinal surface of the first boss, the longitudinal surface of the first boss exerting forces upon the longitudinal surfaces of the second boss, thus locking the first and second bosses into position in the support arm hole.

18. A paired set of load beam assemblies as set forth in claim 17, wherein the longitudinal surfaces of the first and second bosses and bevelled, thus providing a wedged friction fit.

19. A paired set of load beam assemblies as set forth in claim 17, wherein the inner diameter of the first and second bosses is zero, such that the first and second bosses are solid, not hollow.

20. A paired set of load beam assemblies as set forth in claim 19, wherein the first boss contacts the second boss at one or more mating edge surfaces, and the mating edge surfaces are bevelled to provide a friction fit of the first and second bosses in the support arm.

21. A paired set of load beam assemblies, as set forth in claim 20, further including rework means for disassembling and reassembling the paired set of load beam assemblies, the rework means including one or more shims placed between the bevelled mating edge surfaces.

22. A paired set of load beam assemblies for use with a disk drive head stack assembly, the head stack assembly including a support arm having a first side, a second side opposite the first side, and a support arm hole, the load beam assemblies comprising:
    (a) a first load beam assembly including a first boss having a central axis, the first boss being inserted into the support arm hole from the first side of the support arm; and
    (b) a second load beam assembly including a second boss having a central axis, the second boss being inserted into the support arm hole from the second side of the support arm;
    (c) wherein the central axis of the first boss is substantially aligned with the central axis of the second boss;

(d) wherein the first and second bosses each further comprise two semicircular projections with reference to a radial cross-sectional plane; a first semicircular projection having an inner radius $R_1$, and an outer radius $R_2$; and a second semicircular projection having an inner radius $R_3$ and an outer radius $R_4$; such that $R_1$ is less than or equal to $R_2$; $R_2$ is less than or equal to $R_3$; and $R_3$ is less than or equal to $R_4$;

(e) the semicircular projections of the first boss being symmetrical to the semicircular projections of the second boss when the respective bosses are inserted from opposite sides of the support arm;

(f) the first semicircular projection of the second beam nesting within the second semicircular projection of the first boss; the first semicircular projection of the first boss nesting within the second semicircular projection of the second boss;

(g) the longitudinal surfaces of the respective first semicircular projections exerting forces upon the longitudinal surfaces of the respective second semicircular projections to effectively fasten the load beam assemblies to the support arm.

23. A paired set of load beam assemblies as set forth in claim 22, further including fastener means for fastening the paired set of load beam assemblies to the support arm; the fastening means comprising one or more bars placed within the inner radius $R_1$ of the first and second bosses to expand the outer diameters of the first and second bosses sufficiently to secure the first and second bosses to the support arm assembly.

24. A disk head assembly including:
(a) a support arm having a cruciform-shaped staking hole including a first pair and a second pair of mutually-orthogonal slots;
(b) a first load beam assembly having a first boss with a central axis, an outer diameter, and two projections extending in a radial direction beyond the outer diameter; the projections mating with the first pair of mutually-orthogonal slots; and
(c) a second load beam assembly having a second boss with a central axis substantially parallel to the central axis of the first boss, an outer diameter, and two raised projections extending in a radial direction beyond the outer diameter; the projections mating with the second pair of mutually orthogonal slots.

25. A disk head assembly including:
(a) a support arm having an upper side, a lower side, and an octagonally-shaped staking hole; the staking hole having a first radius defined as the distance from the center of the octagon to an outer apex, and a second radius defined as the distance from the center of the octagon to a mid-point on a flat edge of the octagon; the first radius being greater than the second radius;
(b) a first load beam assembly having a first boss with a central axis; the radial cross-section of the boss being configured in the form of half of an octagon, the octagon having a first radius defined as the distance from the center of the octagon to an outer apex, and a second radius defined as the distance from the center of the octagon to a mid-point on a flat edge of the octagon; the first radius being greater than the second radius;
(c) a second load beam assembly having a second boss with a central axis; the radial cross-section being configured in the form of half an octagon, the second boss being symmetrical with respect to the first boss such that a substantially complete octagon is formed by the first and second bosses when the first and second load beam assemblies are inserted into opposite sides of the support arm;
(d) the first and second bosses being inserted into the staking arm from opposite sides of the staking arm, and the bosses then being radially twisted by approximately 22½ degrees, such that the greater radii of the octagon formed by the first and second bosses is cammed against the lesser radius of the staking hole, thereby locking the first and second load beam assemblies to the support arm.

26. A disk head assembly including:
(a) a support arm having an octagonally-shaped staking hole, an upper surface, and a lower surface;
(b) a first load beam assembly including a first boss having a central axis and two wedge-shaped projections extending radially outward from the central axis; each wedge-shaped projection having longitudinal surfaces;
(c) a second load beam assembly including a second boss having a central axis and two wedge-shaped projections extending radially outward from the central axis; each wedge-shaped projection having longitudinal surfaces;
(d) the first boss being inserted from the upper surface of the support arm, and the second boss being inserted from the lower surface of the support arm, the first boss being symmetrical with respect to the second boss; the wedge-shaped projections of the first boss being radially-interlaced with the wedge-shaped projections of the second boss, such that at least one longitudinal surface of the first boss contacts at least one longitudinal surface of the second boss at a mating edge interface; such that at least one longitudinal surface of the first boss contacts the staking hole; and such that at least one longitudinal surface of the second boss contacts the staking hole; the first boss exerting force on the second boss, and the first and second bosses exerting forces on the staking hole, thereby locking the first and second load beam assemblies in position on the support arm.

27. A disk head assembly as set forth in claim 26 wherein the mating edge interfaces of the first and second bosses are bevelled, such that upon insertion of the first and second bosses into the staking hole, the first and second bosses are compressed, thereby causing the first and second bosses to be friction-fitted into the staking hole.

28. A disk head assembly including:
(a) a support arm having a first side, a second side and a staking hole having a midline, the hole being adapted to receive two bosses side-by-side;
(b) a first load beam assembly insert having a first boss having a central longitudinal axis spaced apart from the midline of the staking hole;
(c) a second load beam assembly insert having a second boss having a central longitudinal axis spaced apart from the midline of the staking hole; the spacing of the central longitudinal axis of the second boss being geometrically symmetrical with the spacing of the central longitudinal axis of the first boss when the first boss is inserted into the staking hole from the first side of the support arm and the second boss is inserted from the second side of the support arm, thus permitting the first boss and the second boss to fit side-by-side in the staking hole.

29. A disk head assembly as set forth in claim 28, the first and second bosses each being octagonally-shaped with reference to a radial cross-sectional plane; the first and second bosses being inserted into the staking hole and then twisted about their longitudinal axes, causing the first boss to cam against the second boss, thereby firmly attaching the load beam assembly to the support arm.

30. A disk head assembly as set forth in claim 28, the first and second bosses each being noncircularly-shaped with reference to a radial cross-sectional plane; the first and second bosses being inserted into the staking hole and then twisted about their longitudinal axes, causing the first boss to cam against the second boss, thereby firmly attaching the load assembly to the support arm.

31. A disk head assembly as set forth in claim 28, the first and second bosses each further comprising "L"-shaped cams with reference to a longitudinal plane, the "L"-shaped cam of the first boss being symmetrical with the "L"-shaped cam of the second boss, the "L"-shaped cams each having radial surfaces situated in radial cross-sectional planes, such that at least one radial surface of the cam of the first boss passes across and overlaps at least one radial surface of the cam of the second boss when (1) the first load beam assembly is inserted into the staking hole from the first side of the support arm, (2) the second load beam assembly is inserted into the staking hole from the second side of the support arm, (3) the first boss is rotated 90 degrees in a first direction about its central axis, and (4) the second boss is rotated 90 degrees in a second direction opposite from the first direction about its central axis, thus bringing about an interlocking of the first boss, the second boss, and the support arm.

* * * * *